(12) United States Patent
Gratzl et al.

(10) Patent No.: US 8,323,462 B2
(45) Date of Patent: Dec. 4, 2012

(54) DEVICE FOR THE ADJUSTMENT OF THE PH OF AQUEOUS SOLUTIONS

(75) Inventors: Miklos Gratzl, Mayfield Heights, OH (US); Gautam Nithyanand Shetty, Hackensack, NJ (US)

(73) Assignee: Case Western Reserve University, Cleveland, OH (US)

( * ) Notice: Subject to any disclaimer, the term of this patent is extended or adjusted under 35 U.S.C. 154(b) by 906 days.

(21) Appl. No.: 11/630,066

(22) PCT Filed: Jun. 27, 2005

(86) PCT No.: PCT/US2005/022607
§ 371 (c)(1),
(2), (4) Date: Aug. 27, 2008

(87) PCT Pub. No.: WO2006/017000
PCT Pub. Date: Feb. 16, 2006

(65) Prior Publication Data
US 2008/0308421 A1 Dec. 18, 2008

(51) Int. Cl.
*C02F 1/461* (2006.01)
*C02F 1/66* (2006.01)
*C25B 1/04* (2006.01)
*C25B 9/00* (2006.01)

(52) U.S. Cl. .................. 204/271; 204/228.6; 204/230.5; 204/273; 204/433; 205/335; 205/742; 205/743; 205/787.5

(58) Field of Classification Search ............... 204/228.6, 204/230.5, 263, 271, 273, 433, 520, 541; 205/335, 742, 743, 746, 787.5
See application file for complete search history.

(56) References Cited

U.S. PATENT DOCUMENTS

| | | | | |
|---|---|---|---|---|
| 3,065,156 A | * | 11/1962 | Thompson et al. | 204/271 |
| 3,769,178 A | * | 10/1973 | Rothermel, Jr. | 205/787.5 |
| 4,217,898 A | * | 8/1980 | Theeuwes | 424/433 |
| 4,374,714 A | | 2/1983 | Hekal | |
| 4,619,749 A | * | 10/1986 | Nusbaum | 204/271 |
| 5,795,459 A | * | 8/1998 | Sweeney | 204/271 |
| 6,139,714 A | | 10/2000 | Livshits | |

* cited by examiner

*Primary Examiner* — Keith Hendricks
*Assistant Examiner* — Steven A. Friday
(74) *Attorney, Agent, or Firm* — Tarolli, Sundheim, Covell & Tummino LLP

(57) ABSTRACT

A device for adjustment of the pH of a target liquid includes a working electrode (10), an electrolyte chamber (16) which holds an electrolyte (14), a counter electrode (12) in electrical contact with the electrolyte, a junction (18) which spaces the electrolyte from a target liquid (20) when the working electrode is in contact therewith, and a source of current (22), for supplying current to the working electrode for electrolysis of water at the working electrode, whereby the pH of the target solution is adjusted.

26 Claims, 6 Drawing Sheets

DEVICE FOR THE ADJUSTMENT OF THE PH OF AQUEOUS SOLUTIONS

BACKGROUND

1. Field of the Invention

The present exemplary embodiment relates to the chemical arts. It finds particular application in conjunction with a device for adjusting the pH of a liquid, and will be described with particular reference thereto. However, it is to be appreciated that the present exemplary embodiment is also amenable to other like applications.

2. Discussion of the Art

The pH of any solution is one of the most important properties of that solution. Therefore, in any wet laboratory context, be it in a research, educational, or industrial laboratory, it is often desirable for the pH of the solutions and liquid reagents used to be controlled and known. Before any solution is used as a reagent, or as a sample for some measurement, its pH is often adjusted to a specific value. Also, there are certain processes that proceed only at an optimum pH.

The pH adjustment of a target solution is currently carried out by volumetric addition of a suitable acid and/or base solution until the pH reaches the desired value or range. This is achieved in most settings manually, but other convective schemes such as the use of a piston burette or a syringe also exist.

The actual pH during adjustment is generally measured or monitored to make sure that the end pH reached is acceptable. A predetermined amount of addition of an acid or base to a sample is often unsatisfactory since, even for well know solutions, variability in buffer capacity, dependence on pH, absorbed air carbon dioxide, and many other factors can affect how much the pH shifts upon the addition of a known amount of acid or base to a known volume of the sample. A feedback system may be employed, in the form of a pH measuring electrode, a pH indicator, or some other means.

Besides acid or base addition and pH assessment, it is common for stirring to be carried out after each addition, to ensure homogeneity of the solution before assessing the pH. This is generally performed manually, for example, by shaking the sample container or by mixing with a glass rod, or the like. Magnetic stirrers and vibrated platforms are also used.

The buffer capacity of pH can vary over a very large range (orders of magnitude). As a result, it is common for lab personnel to have available to them a number of acid and base solutions of various strengths to adjust pH. The adjustment of pH is generally performed by a trial and error process. It is not uncommon to overshoot the intended pH after multiple additions of an acid or base. This iterative process can go on over many steps to finally reach an acceptable pH value. This takes time and may result in dilution of the target solution which is generally undesirable, especially in small volumes.

The present application provides a new and improved system and method for adjustment of pH which overcomes the above-referenced problems, and others.

BRIEF DESCRIPTION

In accordance with one aspect of the exemplary embodiment, a device for adjustment of the pH of a target liquid is provided. The device includes a working electrode, an electrolyte chamber which holds an electrolyte, a counter electrode in electrical contact with the electrolyte, a junction which spaces the electrolyte from the target liquid when the working electrode is in contact therewith, and a source of current, for supplying current to the working electrode for electrolysis of water at the working electrode, whereby the pH of the target solution is adjusted.

In accordance with another aspect of the exemplary embodiment, a method for adjusting pH of a target liquid includes contacting the target liquid with a working electrode, supplying current to the working electrode to electrolyze water in the target liquid, and conducting current between the working electrode and a counter electrode, spaced from the target liquid by a junction which resists passage of at least one of ions generated at the working electrode and counter ions generated at the cathode.

One advantage of at least one aspect of the exemplary embodiment is that it can eliminate the need to provide volumes or drops of many sizes from many different beakers containing acids and bases with pipettes, syringes, or other tools.

Another advantage of at least one aspect of the exemplary embodiment is that the pH can be adjusted without dilution, which is advantageous in many applications.

DETAILED DESCRIPTION

In accordance with one embodiment, a system for adjusting pH of a target liquid (e.g., water or an aqueous solution containing water) enables pH to be adjusted by applying a current to the target liquid to split water in the target liquid electrochemically, thereby generating hydrogen ions or hydroxyl ions, depending on the direction of the current.

In accordance with one embodiment, a method for adjustment of pH is provided. The method includes electrochemical water splitting in a target liquid. The method can be carried out with non-volumetric addition of acid and base. In one embodiment, a positive or negative current is injected, depending on whether an acid or a base shift is desired, into the target liquid from a suitable electrode. This current can be easily varied over many orders of magnitude with available circuitry to adapt the adjustment process to the size of liquid sample, its pH, the desired pH, and its composition including buffer capacity. The addition is also continuous in nature. Therefore, the end pH can be reached in a minimum amount of time, with minimal overshoots, and without the need for any external acid/base reagents or dilution.

A first embodiment of a device contains a battery to drive the circuitry and supply the current to be injected. The working electrode(s) are exposed near its tip, and the counter electrode is in contact with the aqueous compartment and makes indirect contact with the target solution at the junction.

The entire device is contained within a pen-like body. It may also have an on/off switch and/or a variable control that determines how much current is being injected and in which direction.

Figure 1:
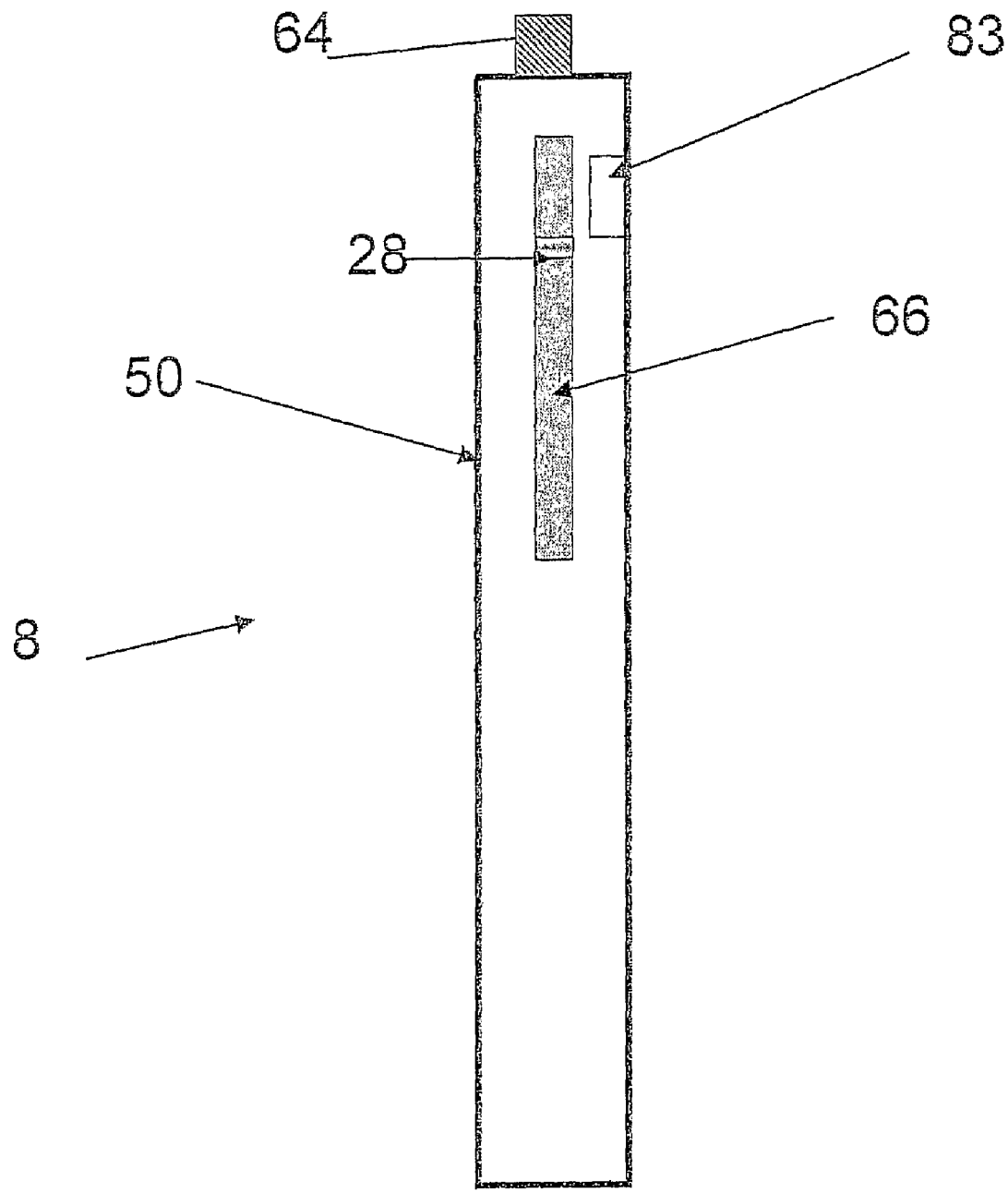
FIG. 1 is a schematic side elevational view of a pH adjustment device for adjusting a pH of a target liquid, in accordance with a first embodiment.
Figure 2:
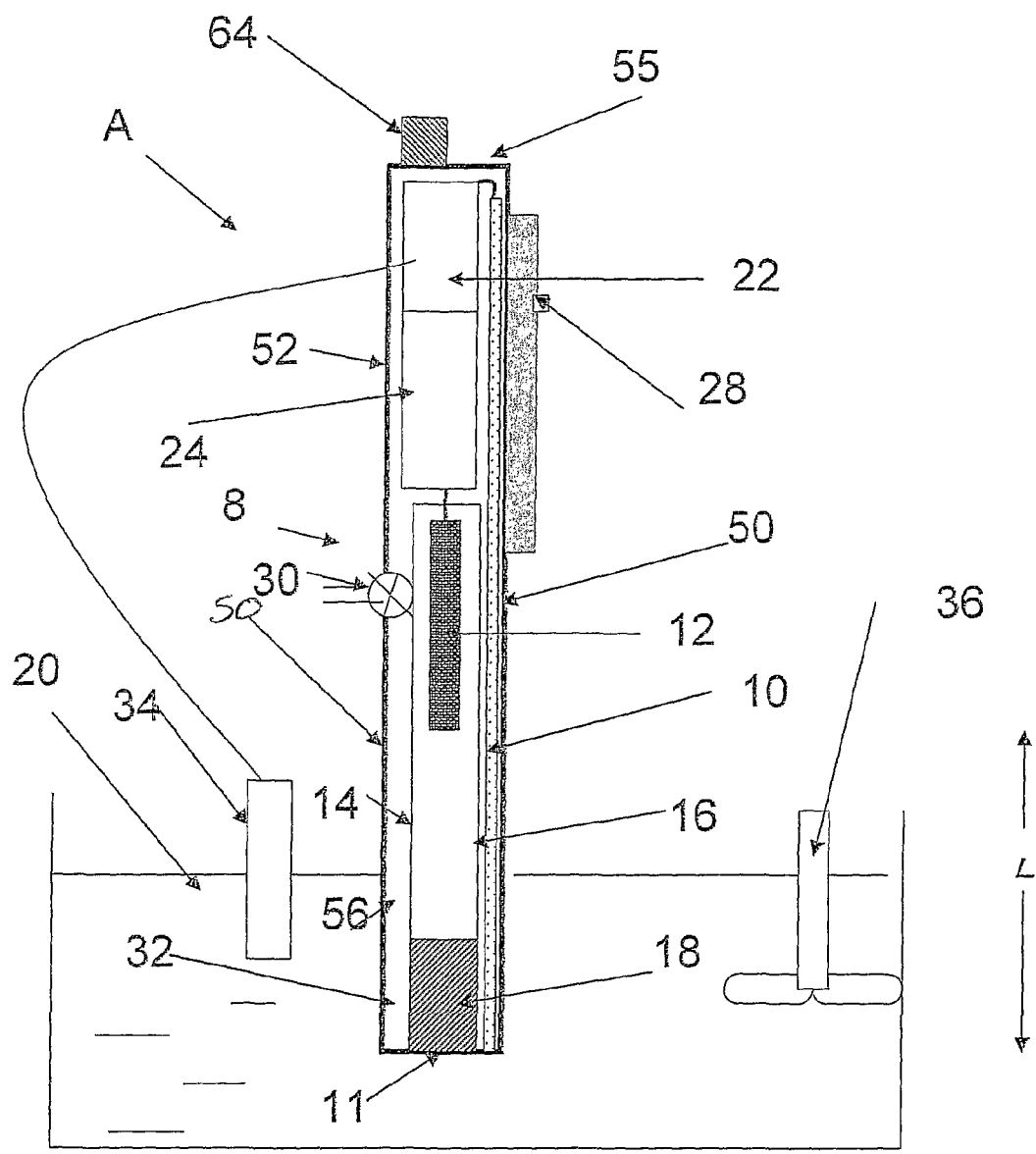
FIG. 2 is a side view, in partial section of the device of FIG. 1 contacting a target liquid.
Figure 3:
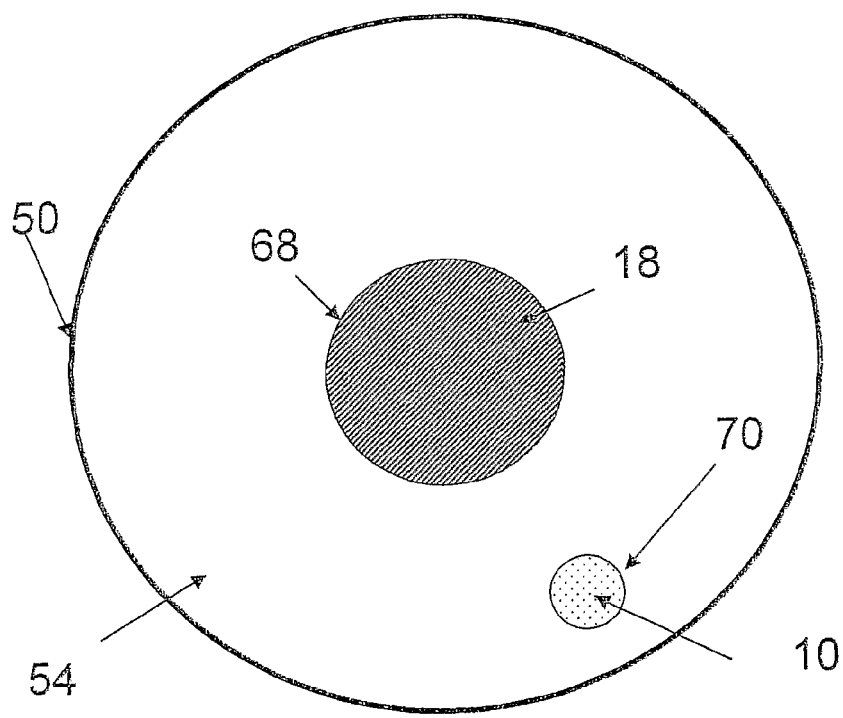
FIG. 3 is an enlarged bottom view of the device of FIG. 1.
Figure 5:
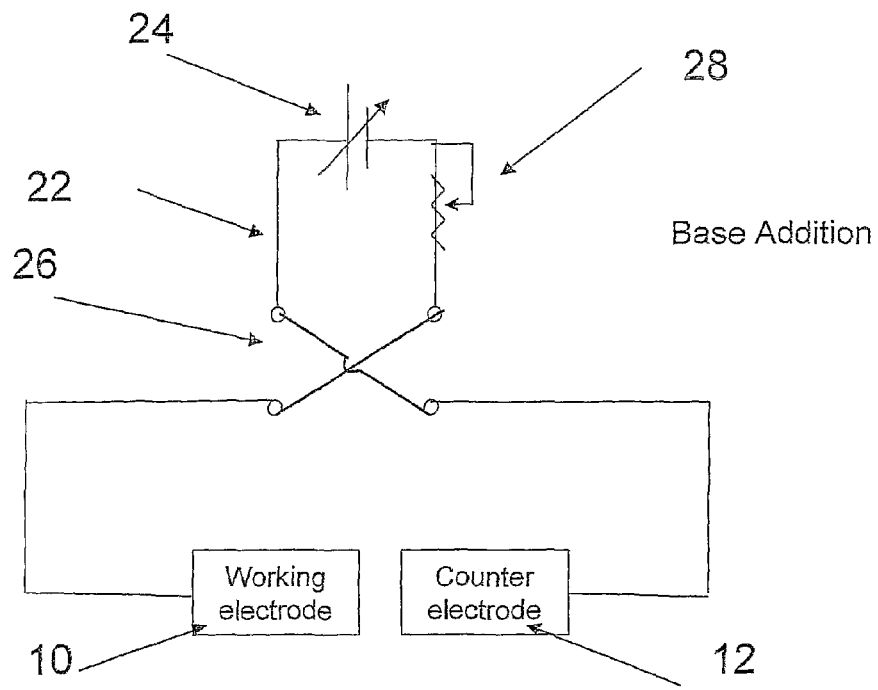
FIG. 5 is a circuit diagram for the devices of FIGS. 1-5 for base addition.
Figure 6:
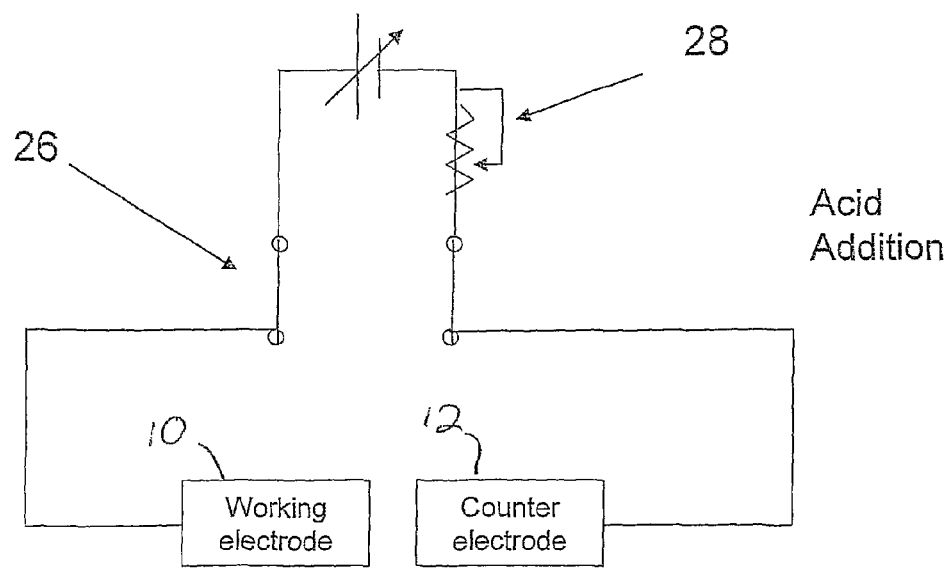
FIG. 6 is a circuit diagram for the devices of FIGS. 1-5 for acid addition.

One embodiment of a system A for adjustment of pH is shown in FIGS. 1-3 and includes a handheld device 8 which may be in the shape of a pen (a "pH Pen") that contains appropriate instrumentation and is partially immersed into the target solution during the adjustment process. FIG. 2 shows the inner compartments of the device 8 as well as one method in connecting the working electrode(s) to the electronics stored in the cap of the pen. A suitable circuit for the device or for other similar devices for inducing pH adjustment is illustrated in FIGS. 5 and 6. In another embodiment, a pH-adjusting system is integrated with the beaker or vessel in which the target solution is placed for pH adjustment. Another embodiment is a mechanized or automatic instrument which has one or several heads that can address one or several solutions simultaneously to adjust the pH of each to desired values.

Figure 4:
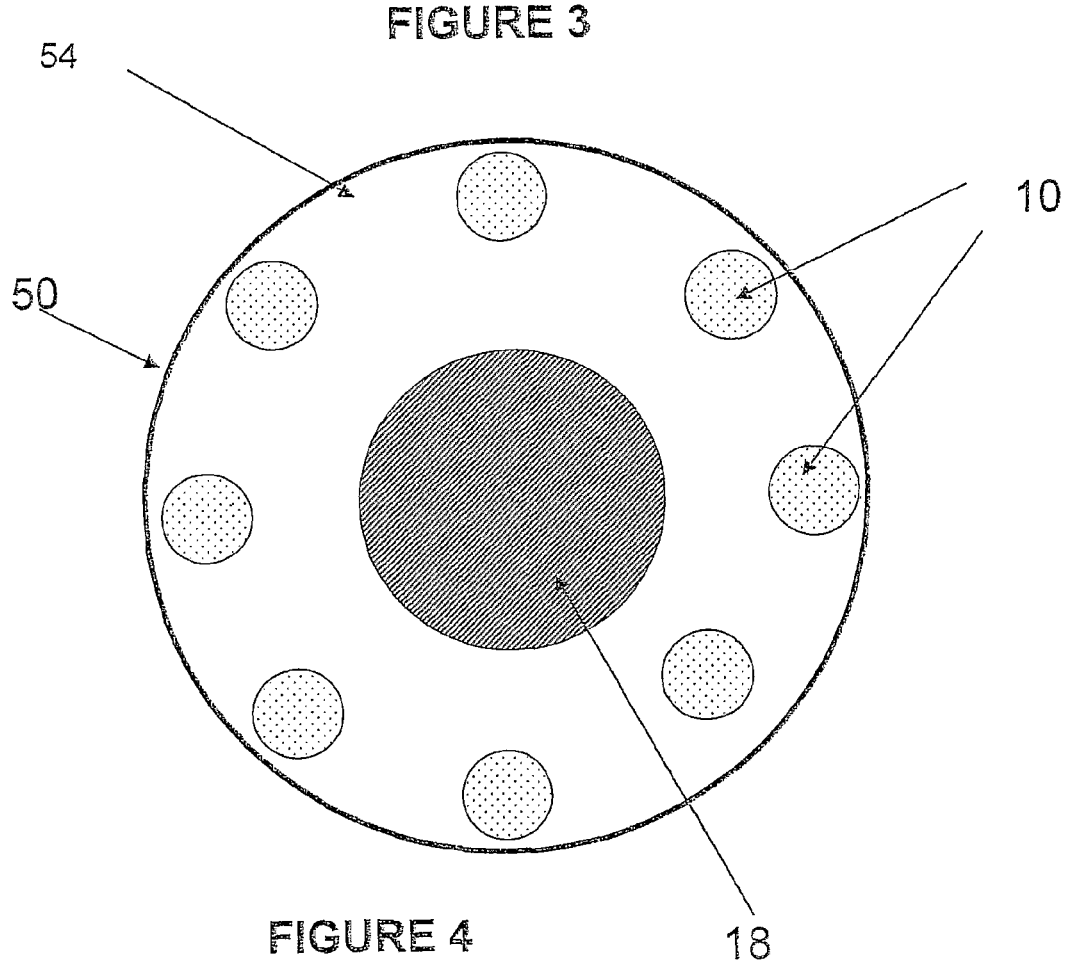
FIG. 4 is a bottom view of a second embodiment of a pH adjustment device with multi-array working electrodes.

All these embodiments may have the following elements in common. With particular reference to FIG. 2, the system includes one or more inert working electrodes 10, e.g., made of platinum or the like, as the acid or base generating electrode. The working electrode 10 may be in the form of a disk, as shown, with a surface 11 exposed to the target liquid. Alternative shapes are also considered, such as a ring. FIGS. 1-3 illustrate an embodiment with a single working electrode 10 while FIG. 4 illustrates an embodiment with multiple, radially-spaced working electrodes 10.

A second electrode 12, which may be made of similar material to the working electrode or a different material, is a counter electrode. The counter electrode 12 may be larger in size (in terms of its exposed surface) that the working electrode 10 and is housed in an aqueous compartment or chamber 14 that is filled with a suitable electrolyte 16. The electrolyte 16 is in fluid communication with a junction 18. The junction 18 acts as a conductive medium to electrically connect the aqueous compartment and counter electrode with the working electrode(s) 12 via the target liquid 20.

The liquid junction 18 physically separates the working electrode 10 from the counter electrode 12 and ensures that electrochemical products formed at the counter electrode do not reach the target solution 20 which is in contact with the working electrode 10 (or only move into the target solution 20 at a relatively slow rate such that the pH of the target solution is primarily affected by the ions generated at the working electrode). The liquid junction 18 may be in the form of a gel, such as a hydrogel, a glass frit, a membrane, a porous metal membrane, a combination of the above, or the like. The junction may consist of a hydrogel such as HEMA polymer and may be capped by a porous plug (not shown) at its interface with the target solution. The hydrogel may have ionic strength at least equivalent to the electrolyte solution 16 in the electrolyte compartment.

The junction 18 may be capable of passage of current therethrough without appreciable transfer of hydrogen and/or hydroxyl ions between the target liquid 20 and the electrolyte 16. When in contact with the target liquid 20, the working and counter electrodes 10, 12 form part of an electric circuit 22 (FIGS. 5 and 6) that can inject positive or negative current across the working electrode and absorb the same or a multiple of the current at the counter electrode 12. The circuitry 22 may be powered by a suitable source of current 24 such as a battery or other DC power source. The amount of current can be adjusted to produce the desired amount of pH change, and the direction of pH can be controlled by the direction of the current injected in the solution. The length L of the junction 18, defined as the shortest distance between the working and the counter electrodes, is selected such that electrochemical products from the counter electrode 12 do not affect the target solution 20 during the course of pH adjustment.

FIGS. 4 and 5 show the configuration 20 of the circuit for base and acid addition, respectively. The circuit 22 includes a two way switch 26 which changes the direction of the current from a first direction (FIG. 4) to a second direction (FIG. 5). A slide potentiometer 28 varies the current flow and thereby varies the pH adjustment rate.

When a current is induced in the target solution 20, electrolysis of water occurs preferentially at the respective electrodes 10, 12. In the case of electrolysis of water molecules, the working electrode(s) and counter electrode function as the cathode and anode respectively (or the reverse, depending on the direction of the current), and these sites are where the electrochemical reduction or oxidation takes place. Depending on the direction of the current, ions are generated at the working electrode 10 and counter electrode 12 by splitting of water. Current flow in one direction causes the splitting of water to form hydrogen ions and oxygen gas at the working electrode 10 while hydroxyl ions and hydrogen gas are generated at the counter electrode 12. When current is passed in a reverse direction, the opposite reactions occur, i.e., hydroxyl ion generation occurs at the working electrode and hydrogen ion generation at the counter electrode. The electrode reactions are summarized as:

at the anode: 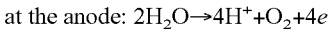 $2H_2O \rightarrow 4H^+ + O_2 + 4e^-$ at the cathode: 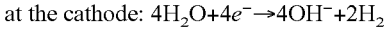 $4H_2O + 4e^- \rightarrow 4OH^- + 2H_2$ When an acid pH is desired, or an increase in the acidity of the target solution, the current flow is selected such that the working electrode 10 serves as the anode to generate hydrogen ions. The counter electrode 12 serves as the cathode, where hydroxyl ions are generated. The hydroxyl ions are largely retained within the compartment 14 in the electrolyte 16 so that the pH in the target liquid 20 increases as a result of the excess of hydrogen ions. When an alkaline solution is desired, or an increase in alkalinity, hydroxyl ions are generated at the working electrode 10, which serves as the cathode.

The aqueous compartment 14 housed within the pH pen 8 serves to accumulate the counter ion. The junction 18 prevents or significantly inhibits transfer of hydrogen ions and hydroxide ions between the compartment 14 and the target solution.

Since gas may be generated at both the working electrode 10 and counter electrode 12, it is desirable to allow for pressure release. Gas evolution can be mitigated by employing a counter electrode with very low resistance (large electrode area or porous counter electrode). To release gas generated at the counter electrode, the compartment 14 may include a pressure release mechanism, such as a check valve 30, which vents the compartment 14 to maintain an approximately atmospheric pressure within the compartment.

The applied current can range from nanoamperes to amperes depending on the respective solutions 20, 16 to effect a pH change. The target solution 20 and electrolyte 16 in the compartment 14 (which both serve as electrolytes) allow current flow between the working electrode(s) 10 and the counter electrode 12. Design variations may allow the device 8 to work in solutions irrespective of the ionic conductivity.

For pH adjustment, the working electrode 10 and the junction 18 are simultaneously brought in fluid contact with the sample or target liquid 20 and then the desired current is injected. Voltage source 24, such as a battery, applies a voltage across the working and counter electrodes. Once the working electrode(s) 10 and the junction 18 are in contact with the target solution 20, the circuit is completed. This allows the current to pass through the working electrode(s) into the solution 20 and into the compartment 14 through the junction 18, or vice versa depending on the direction of the current. Without such contact, the device 8 has an open circuit (between the working electrode(s) and the counter electrode), which provides no current, and thus no pH adjustment. Accordingly, pH adjustment can be initiated simply by placing a tip 32 of the device in contact with the target solution 20 and stopped by discontinuing contact.

Figure 7:
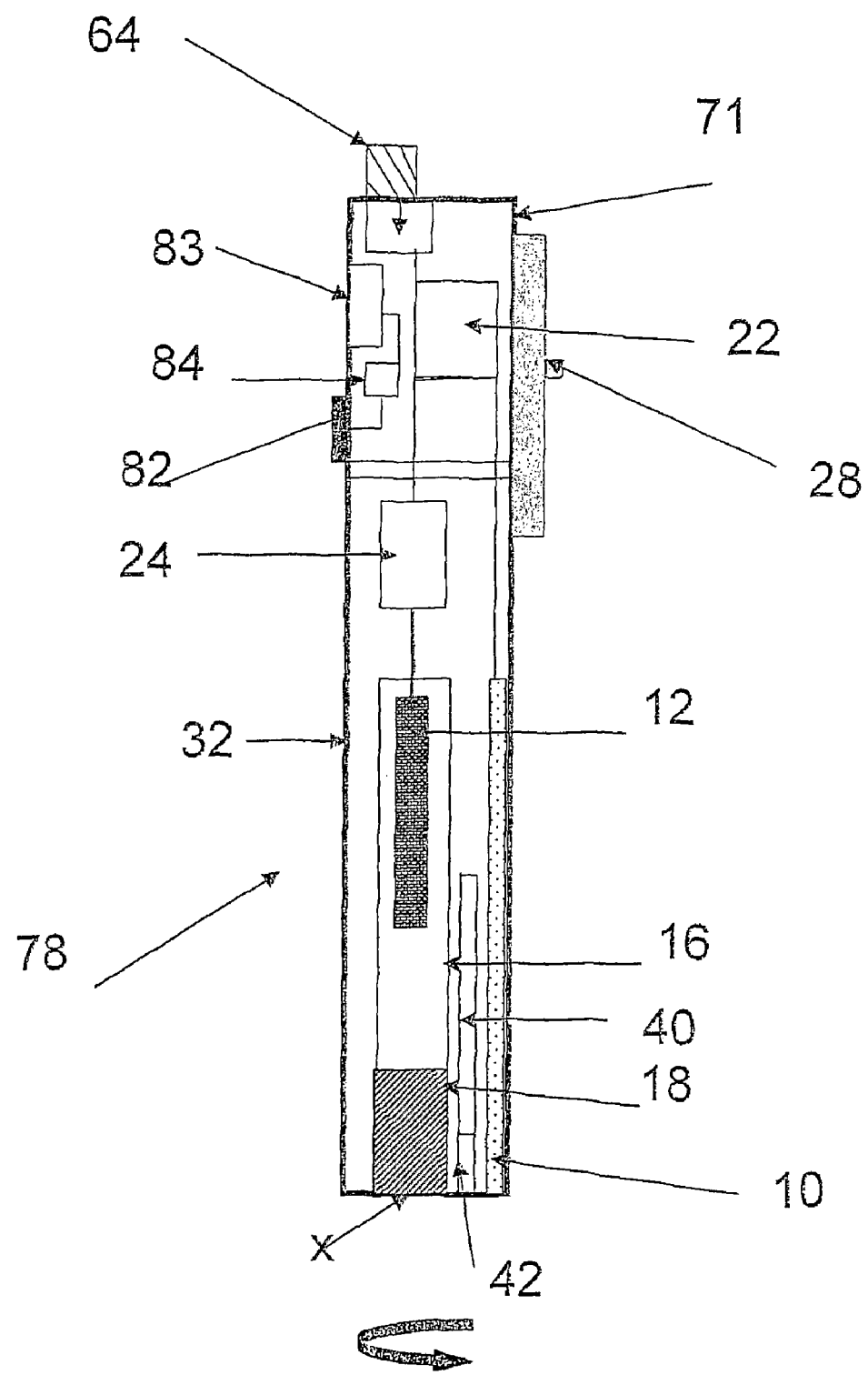
FIG. 7 is a side sectional view of a third embodiment of a pH adjustment device for solutions with low or zero conductivity.

To monitor the process, a pH measuring device 34 may be employed, such as a pH meter. Additionally, a stirring mechanism 36 may be employed to stir the target liquid. The stirrer 36 and pH meter 34 may be conventional devices, separate from the pH adjusting device. Alternatively, one or both may be integrated in the pH-Pen, as illustrated in FIG. 7.

The aqueous compartment 14 in the pen or other pH adjustment device serves to accumulate the counter-ion of the hydrogen or hydroxyl ion injected in the target solution. It can also become alkaline or acidic. In one embodiment, the compartment is accessible to an operator so that it can be emptied and refilled. In another embodiment, the compartment liquid is regenerated by placing the device in an equal amount of base solution, e.g., in a different container after acid accumulation in the compartment, or vice versa. The junction 18 to the target solution may be just under a platinum "collar" or discs that generates the acid or base.

By-products formed at the working electrode due to electrochemical oxidation/reduction of electroactive species present in the target solution generally do not affect the pH adjustment itself. However, they may cause the production of an unwanted chemical at the electrode which may affect the use of the pH-adjusted solution. This may be countered by using relatively high current density pulses that tend to split water more effectively than inducing diffusion current by some other component.

Hydrogen or oxygen evolution generally does not induce any problem directly; and may help in homogenization of the target solution.

Figure 8:
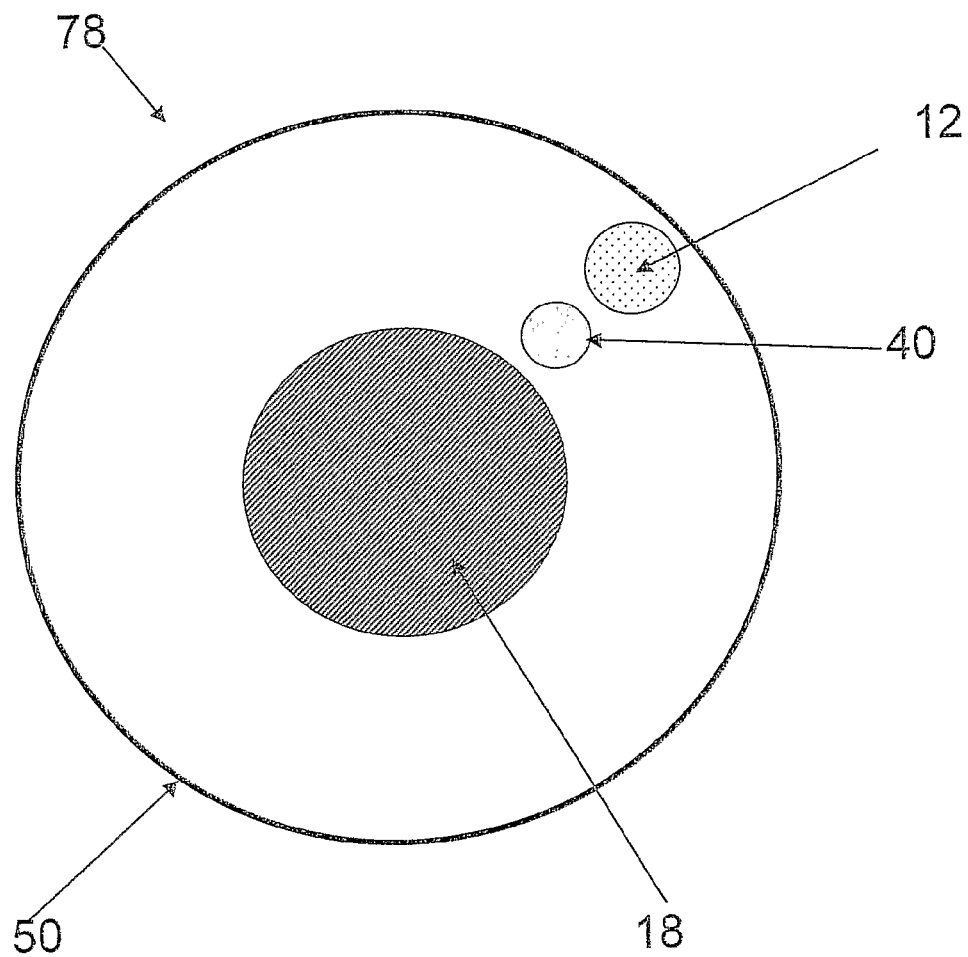
FIG. 8 is a bottom view of the pH adjustment device of FIG. 7.

If an electrolyte is not already present in the target liquid 20 in a sufficient amount for current to flow (for example, in the case of pure water) one or more buffers or other chemicals of interest may be added to the target liquid prior to pH adjustment. Alternatively, an electrolyte chamber 40 may be provided in the device as shown in FIGS. 7 and 8. The chamber 40 introduces an electrolyte into the target solution by diffusional titration, for example, by an electrolyte junction 42 in contact with the target liquid 20. The electrolyte in the chamber 40 can be the same or different from the electrolyte 16.

With particular reference to FIGS. 1-3, the pH adjustment device 8 includes a pen-shaped body or housing 50 having a cylindrical wall 52, a circular base wall 54 at the tip, and an upper wall 55. The housing 50 defines an enclosed interior 56. The compartment 14 is in the form of a container which is disposed within the interior 56 and has an open end coplanar with the base wall 54. The junction 18 is located within the container 14 and holds the electrolyte 16 within the chamber. The counter electrode 12 is disposed within the container 14 in contact with the electrolyte 16. A suitable connection wire 62 connects the counter electrode with the battery 24. The two way switch 26 may be operated to change the current flow by a suitable button 64 or other operating device on top of the 'pen'. The slide potentiometer 28, or an operator therefor, may be located on a clip 66 mounted to an exterior surface of the housing 50. The clip 66 may also serve to attach the pH pen 8 to a pocket of a user or the like, when not in use. As shown in FIG. 3, the base 54 defines a circular opening 68 which exposes the junction 18 to the liquid 20. Another opening 70 in the base 54 exposes the surface(s) of the working electrode(s) 10. Electric/electronic circuitry, including circuitry 22, is contained within a cap portion 71 of the body 50.

In the embodiment of FIG. 4, the working electrodes 10 are arranged around the central opening 68. The working electrode(s) 10 may be small disks or electrodes. In one embodiment, shown in FIG. 4, the working electrodes comprise small disc electrodes that are flush with the bottom surface of the device 8. In the embodiments of FIGS. 1-4, the exposed surfaces of the electrode(s) 10 are on the bottom of the base of the device. However they can alternatively or additionally be arranged in the form of a collar along the side wall 52 of the device. Other embodiments are also contemplated, in which the working electrodes 10 may include spiral orientations, staggered electrodes, varying their sizes, or using rings, rods, fork or spatula shaped electrodes, and the like. The sizes of the working electrode(s) 10 can vary from the micron scale to a few meters in diameter, if a circle, or other suitable dimension.

To enhance the accessible range of the rate of pH adjustment, the pH adjustment device 8 may incorporate more than one working electrode or one with a designated size or configuration designed for specific pH adjustment situations. For example, where a high injection rate is desired, a larger electrode 10 can be selected and/or multiple electrodes 10 utilized simultaneously. Where a lower injection rate is desired, smaller electrodes 10 can be used and/or various algorithms performed, e.g., lower currents, pulsing, square wave, or the like to create a slow pH adjustment rate. In more automated versions, the electronics 22 can be responsible for the choice of injection rate and method of achieving it by determining which configuration of working electrode(s) 10 to activate, from those available on the device 8, would be best in achieving the desired result. In simpler versions of the device, the operator may select the electrodes, based on prior knowledge, lookup tables, feedback from a pH monitor external to the device, or the like.

The container 14 may include a fill opening, (not shown), e.g., on a side wall thereof, for emptying the electrolyte 16 and refilling with fresh electrolyte. Alternatively, the container is removable from the housing 50, for replacement and/or emptying and refilling.

FIGS. 7 and 8 show schematic views of another embodiment of a pH adjustment device 78 which is similarly configured to the device 8, except as noted. The device 78 includes working electrode(s) 10, a pH meter 34 and a junction 18 at the bottom of a body 50 of the device. An aqueous compartment 14, battery 24, and counter electrode 12, are contained within the body 50 of the device. The junction 18 may be in the form of a hydrogel, housed within the body. A sliding lever 28 permits a user to vary the current (pH adjustment rate). The body also houses suitable electronics to run the device.

As shown in FIG. 7, an integral system A comprises a pH adjusting device 78 with an integral stirring mechanism 36. The stirring mechanism includes a rotatable or vibrated stirring member 80 that ensures homogenization of the target solution 20 during pH adjustment. The stirring member 80 may be powered by the battery 24 or by a separate power source. Optionally, an integral pH monitor 34 includes sensor 82 which monitors and the pH and a display 83 (FIG. 1) which displays the pH of the target solution. Either or both the stirring member 80 and monitor 34 may be included in a single device. To incorporate stirring and pH measurement in a single pen-like device 78, stirring may be provided by rotation of the tip part 32. The pH monitor 82 with independent circuitry 84, junction, and the like, may be included above the tip 32. The working electrode 10 and the junction 18 may be on the rotated part. This helps to prevent accumulation of gas bubbles in the tip 32 which are formed as a result of electrolysis of water.

The pH monitor 34 may have automatic feedback to the circuitry 22 to stop current supply to the working electrode when the desired pH is reached. Where a pH monitor 34 is used, the device may be constructed or operated such that the working electrodes or any other component of the device do not affect the pH monitor. Placing the pH meter 82 away from the working electrodes and ensuring proper mixing of the solution can reduce or eliminate any interference. Alternatively or additionally, the pH adjustment can be temporarily stopped while pH measurements are made. Stirring the solution while the pH measurement is taken, then restarting the pH adjustment until the desired result is achieved is also contemplated. With respect to the mixing apparatus 36, it can be separate from the device, e.g., stir bars, or other traditional stirring mechanisms as shown in FIG. 2, or a part of the device 78, as shown in FIG. 7.

In another embodiment, control functions are also provided such that only the desired pH is adjusted, while the rest of the process occurs automatically through a feedback control system, e.g., the current is allowed to flow until the desired pH is reached and is then switched off. Optionally, the device 78 includes a user interface (not shown) for a user to enter the desired pH. This allows the device to be left unattended during pH adjustment. Such a device can be constructed with or without an on/off switch. In the case of a device without an on/off switch, the switching on can be triggered by completion of the circuit once the device is placed within the target solution 20 and stopped once the pH adjustment process is completed.

To minimize cross-contamination as well as diffusive delivery of contents from the counter electrode compartment via the junction, it is desirable to connect the junction to the counter compartment via an extended conduit. The junction may be positioned at one end of the conduit with the aqueous compartment at the other. The conduit may be in the form of tubing and may be linear, spiral shaped, or the like.

The electrolyte solution 16 within the aqueous compartment 14 is carefully selected. It contains a conducting electrolyte, e.g., ions. These ions are preferably inert towards the target solution and thus do not affect the target solution should some molecules enter the target solution via diffusion (or possible device malfunction or breakage). The pH of the electrolyte can be adjusted to be at or close to the typical desired pH values to be achieved within the target liquid. An example of a suitable electrolyte is potassium nitrate in water, where neutral and slightly acidic pH values are to be adjusted. The electrolyte may contain also a pH buffer, to make its pH more stable with respect to pH changes due to reverse current injection at the counter electrode.

In the event that the electrolyte 16 in the aqueous compartment 14 becomes too acidic or alkaline, a pH indicator, e.g. litmus paper, electrochemical pH meter, etc., may be included in the device 8, 78 to monitor the pH of the electrolyte and the pH indicator may notify the user to take appropriate action. Such action could include (i) replacing the aqueous solution 16, (ii) replacing the aqueous chamber 14 and the solution together, (iii) performing a process that neutralizes the effect within the aqueous compartment.

In one embodiment, the container wall defines the counter electrode 14. Materials used to make the device 8, 78 depending on the application, may be resistant to certain chemicals and extreme pH values. They may also be non-absorptive, hydrophobic, and/or non-conducting. Examples of suitable materials for forming the body and other portions of the device include Teflon™, polyacetal, and combinations thereof. The electrodes 10, 12, however, are electronically conducting and are made of metals such as platinum or the like that easily electrolyze water.

The device 8, 78 of FIGS. 1-8 finds application in research laboratories, hospitals, industrial applications, food and nutrition sciences and the like for preparing target solutions of a selected pH without the need for appreciably affecting the volume of the target liquid. Volumetric changes in the target liquid can be minimal, i.e., less than about 1% or lesser, and in practice, less than 1% of that which would occur if a pH change is to be achieved by conventional means where a liquid acid or alkali is added to the target solution.

The pH of the target liquid 20 may be changed by any suitable amount to achieve any desired pH. For example, the pH may be adjusted by at least 1 (e.g., from pH 7 to pH 6 or pH 8), and in one embodiment, by at least 2 (e.g., from pH 7 to pH 5 or pH 9).

In operation, the device 8, 78 is filled with fresh electrolyte 16 or the electrolyte pH is brought to an initial pH. The switch 26 is placed in an appropriate position, depending on whether a more acidic or basic target solution is desired. Switch positions may be appropriately labeled. The tip 32 of the pen 8, 78 is brought into contact with the target liquid 20.

The pH of the solution is monitored while the pH changes. The electric current may be adjusted to bring about a more rapid generation of hydrogen ions or hydroxyl ions at the start and then reduced as the pH gets closer to the desired pH. The stirring member 36 stirs the target solution 20. The pH is read on the pH meter 34. Once the pH reaches the desired value, the tip of the pen 8, 78 is removed from the target solution. If an overshot occurs, the current can be briefly reversed. The process involves substantially no change in volume of the target liquid. Any changes in volume are such as may be caused by evaporation of the liquid 20. The amount of volume lost through hydrogen/oxygen evolution is generally negligible. Thus the process can be described as non-volumetric.

The invention claimed is:

1. A device (8, 78) for adjustment of the pH of a target liquid comprising:
    a housing (50) defining an enclosed interior (56) and having a base wall (54) at a tip thereof;
    a container (14) disposed within the enclosed interior and holding an electrolyte therein (16), the container having an open end that is coplanar with the base wall, the container including:
    a counter electrode (12) disposed within the container and being in electrical contact with the electrolyte; and
    a junction (18) located within the container and holding the electrolyte within the container, the junction spacing the electrolyte from a target liquid (20) when the working electrode is in contact with the target liquid;
    a working electrode (10) disposed within the enclosed interior; and
    a source of current (22) disposed within the enclosed interior, the source of current for supplying current to the working electrode for electrolysis of water at the working electrode, whereby the pH of the target liquid is adjusted.

2. The device of claim 1, comprising
    a means (26) for reversing the current to the working electrode such that when the current to the working electrode flows in a first direction, the target liquid becomes more basic and when the current flows in a reverse direction, the target liquid becomes more acidic.

3. The device of claim 2,
the means (26) for reversing comprising a switch.

4. The device of claim 1,
the counter electrode, working electrode, and the electrolyte completing an electric circuit (22) when the working electrode contacts the target liquid.

5. The device of claim 1,
the junction being formed of a material which resists passage of ions formed at the counter electrode.

6. The device of claim 1,
the junction being formed of a material which resists passage of at least one of hydroxyl ions and hydrogen ions between the electrolyte and the target solution whereby an excess of hydrogen or hydroxyl ions is generated in the target solution when a current flows between the working electrode and the counter electrode.

7. The device of claim 1,
the junction comprising at least one of a gel, a porous frit, a membrane, and a porous metal membrane.

8. The device of claim 1, comprising
a means (28) for adjusting the current to the working electrode for adjusting a rate of pH change.

9. The device of claim 1,
the housing including a chamber (40), which houses a second electrolyte and a junction (42) which spaces the second electrolyte from a target liquid (20), the junction (42) allowing for diffusional delivery of the second electrolyte into the target solution to increase the conductivity of the target liquid when the chamber (40) is in contact with the target liquid.

10. The device of claim 1,
the housing being in the shape of a pen.

11. The device of claim 1,
comprising a means (34) for measuring the pH of the target liquid, the means (34) being associated with the housing.

12. The device of claim 1,
the source of current (22) comprising a battery.

13. The device of claim 1, comprising a means (36, 80) for stirring the target liquid.

14. The device of claim 1, comprising a source (40) of a second electrolyte for supplying the second electrolyte to the target solution to increase the electrical conductivity of the target solution.

15. The device of claim 1,
the working electrode being formed from platinum.

16. The device of claim 1,
the counter electrode having a larger surface area than the working electrode.

17. The device of claim 1, wherein:
the applied current flows in one direction, an excess of hydrogen ions being formed at the working electrode when the working electrode contacts the target liquid; and
the applied current flows in a reverse direction, an excess of hydroxyl ions being formed at the working electrode when the working electrode contacts the target liquid.

18. The device of claim 1,
the target liquid being electrically conductive.

19. A system (A) for adjustment of pH comprising the device (8, 78) of claim 1 and a least one of a one of a stirring mechanism and a pH monitor, being separate from the device.

20. A method for adjusting pH of a target liquid comprising:
providing a device comprising a housing with an enclosed interior and having a base wall (54) at a tip thereof, a container disposed within the enclosed interior and holding an electrolyte therein, the container having an open end that is coplanar with the base wall, a working electrode disposed within the enclosed interior, and a source of current disposed within the enclosed interior, the container including a counter electrode disposed therein and a junction located within the container, the junction holding the electrolyte within the container;
contacting the target liquid with the working electrode;
supplying current to the working electrode to electrolyze water in the target liquid; and
conducting current between the working electrode and a counter electrode spaced from the target liquid by a junction which resists passage of at least one of ions generated at the working electrode and counter ions generated at the counter electrode.

21. The method of claim 20, comprising:
adjusting the rate of pH change in the target liquid by varying the amount of current applied to the working electrode.

22. The method of claim 20 comprising measuring the pH of the target liquid.

23. The method of claim 20, the direction of current being reversible such that the pH is increased when the current flows in one direction and the pH is decreased when the current flows in a reverse direction.

24. The method of claim 20, the pH being adjusted without a volumetric change of the target liquid.

25. The method of claim 20, the pH of the target liquid being adjusted to a pH which differs from the initial pH of the target liquid by at least 2.

26. A device (8, 78) for adjustment of the pH of a target liquid comprising:
a housing (50) defining an enclosed interior (56) and having a base wall (54) at a tip thereof;
a container (14) disposed within the enclosed interior and holding an electrolyte therein (16), the container having an open end that is coplanar with the base wall, the container including:
a counter electrode (12) disposed within the container and being in electrical contact with the electrolyte; and
a junction (18) located within the container and holding the electrolyte within the container, the junction spacing the electrolyte from a target liquid (20) when the working electrode is in contact with the target liquid, the junction coaxially spaced from the counter electrode;
a working electrode (10) disposed within the enclosed interior; and
a source of current (22) for supplying current to the working electrode for electrolysis of water at the working electrode, whereby the pH of the target liquid is adjusted.

* * * * *